United States Patent
Kimba Dit Adamou et al.

(10) Patent No.: US 12,342,199 B2
(45) Date of Patent: Jun. 24, 2025

(54) MEASUREMENT REPORTING METHOD, TERMINAL DEVICE, AND NETWORK DEVICE

(71) Applicant: VIVO MOBILE COMMUNICATION CO., LTD., Dongguan (CN)

(72) Inventors: Boubacar Kimba Dit Adamou, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 487 days.

(21) Appl. No.: 17/731,216

(22) Filed: Apr. 27, 2022

(65) Prior Publication Data

US 2022/0256386 A1    Aug. 11, 2022

Related U.S. Application Data

(63) Continuation of application No. PCT/CN2020/126741, filed on Nov. 5, 2020.

(30) Foreign Application Priority Data

Nov. 6, 2019  (CN) .......................... 201911078607.0

(51) Int. Cl.
*H04W 24/10* (2009.01)
*H04W 76/14* (2018.01)

(52) U.S. Cl.
CPC ........... *H04W 24/10* (2013.01); *H04W 76/14* (2018.02)

(58) Field of Classification Search
CPC ..... H04W 24/00; H04W 24/02; H04W 24/08; H04W 24/10; H04W 76/14
See application file for complete search history.

(56) References Cited

U.S. PATENT DOCUMENTS

2017/0208638 A1*  7/2017  Baghel ................. H04W 52/46
2018/0332564 A1*  11/2018  Lee ......................... H04L 67/12
(Continued)

FOREIGN PATENT DOCUMENTS

CN        103843392 A      6/2014
CN        108702244 A      10/2018
(Continued)

OTHER PUBLICATIONS

International Search Report issued in corresponding International Application No. PCT/CN2020/126741, mailed Jan. 20, 2021, 4 pages.
(Continued)

*Primary Examiner* — Kevin D Mew
(74) *Attorney, Agent, or Firm* — IPX PLLC

(57) ABSTRACT

This application discloses a measurement reporting method, a terminal device, and a network device. The method is applied to a first terminal device and includes: sending configuration information for a sidelink reference signal received power (RSRP) to a second terminal device; and receiving a measurement result of an RSRP reported by the second terminal device based on the configuration information for the sidelink RSRP. In the embodiments of this application, reporting of an RSRP is triggered through related configuration of the sidelink RSRP, so that a sidelink can support the reporting of the RSRP, and the first terminal device, as a sending device, can know the latest channel state information, so as to better adjust a sending parameter.

20 Claims, 4 Drawing Sheets

(56) References Cited

U.S. PATENT DOCUMENTS

| | | | | |
|---|---|---|---|---|
| 2019/0045465 A1* | 2/2019 | Lee | ...................... | H04W 56/001 |
| 2019/0059013 A1* | 2/2019 | Rahman | ............... | H04B 7/0478 |
| 2019/0075524 A1* | 3/2019 | Zhou | ................... | H04W 52/228 |
| 2019/0190582 A1* | 6/2019 | Guo | ..................... | H04L 27/2607 |
| 2020/0092685 A1* | 3/2020 | Fehrenbach | ........ | H04W 84/005 |
| 2020/0107236 A1* | 4/2020 | Tseng | ...................... | H04W 4/50 |
| 2020/0145867 A1* | 5/2020 | Tseng | ................... | H04B 7/0617 |
| 2020/0314804 A1* | 10/2020 | Shin | ...................... | H04L 5/0055 |
| 2020/0314939 A1* | 10/2020 | Park | ...................... | H04W 72/12 |
| 2021/0315057 A1* | 10/2021 | Baek | .................... | H04W 76/10 |
| 2023/0179337 A1* | 6/2023 | Li | ......................... | H04L 1/1861 |
| | | | | 370/329 |

FOREIGN PATENT DOCUMENTS

| | | | | |
|---|---|---|---|---|
| CN | 109155905 A | 1/2019 | | |
| CN | 109246659 A | 1/2019 | | |
| CN | 109644455 A | 4/2019 | | |
| EP | 3813480 A1 * | 4/2021 | ............ | H04W 24/04 |
| EP | 3817262 A1 * | 5/2021 | ............ | H04L 1/0026 |
| WO | WO-2017052690 A1 * | 3/2017 | ............ | H04L 47/283 |
| WO | WO-2021236951 A2 * | 11/2021 | ............ | H04L 47/18 |
| WO | WO-2022060272 A1 * | 3/2022 | | |
| WO | WO-2022212548 A1 * | 10/2022 | ......... | H04L 43/0882 |

OTHER PUBLICATIONS

ZTE Corporation et al., "Consideration on sidelink RRM measurement", 3GPP TSG RAN WG2 Meeting #106, May 2019.
First Office Action issued in related Chinese Application No. 201911078607.0, mailed Dec. 28, 2021, 12 pages.

* cited by examiner

MEASUREMENT REPORTING METHOD, TERMINAL DEVICE, AND NETWORK DEVICE

CROSS-REFERENCE TO RELATED APPLICATIONS

This application is a continuation of International Application No. PCT/CN2020/126741, filed Nov. 5, 2020, which claims priority to Chinese Patent Application No. 201911078607.0, filed Nov. 6, 2019. The entire contents of each of the above-referenced applications are expressly incorporated herein by reference.

TECHNICAL FIELD

This application relates to the communications field, and in particular to a measurement reporting method, a terminal device, and a network device.

BACKGROUND

At present, a Long Term Evolution (LTE) system supports a sidelink (SL). As shown in FIG. 1, the side link enables direct data transmission between terminal devices (User Equipment, UE) without a network device.

The design of LTE SL applies to specific public security matters (such as emergency communication in a fire place or a disaster place such as an earthquake), Vehicle to Everything (V2X) communication, or the like. The V2X communication includes various services, for example, basic safety-related communication, advanced (autonomous) driving, formation, sensor extension, and the like. Because the LTE SL only supports broadcast communication, the LTE SL is mainly used for basic safety communication. Other advanced V2X services with strict Quality of Service (QoS) requirements in terms of time delay, reliability, and the like will be supported by a New Radio (NR) SL of the fifth generation (5G) mobile communications system. The 5G NR system may be used in an operating band above 6 GHz that is not supported by the LTE, and supports a larger operating bandwidth. However, a current version of an NR system only supports an interface between a network device and a terminal device, and does not support an SL link interface (also known as a PC5 interface) for direct communication between the terminal devices.

In addition, in the NR system, the UE can measure and periodically report a measurement result of a Reference Signal Received Power (RSRP) through a Uu interface. However, in traditional V2X SL transmission, the RSRP measurement result reported by a terminal and received by the network may be different from an actual sidelink RSRP measurement result. Therefore, current configuration for periodic reporting may not apply to an SL of the NR system.

SUMMARY

Embodiments of this application are intended to resolve a technical problem of reporting an RSRP on a sidelink (SL).

According to a first aspect, an embodiment of this application provides a measurement reporting method, where the method is applied to a first terminal device and includes:
sending configuration information for a sidelink reference signal received power RSRP to a second terminal device; and
receiving a measurement result of an RSRP reported by the second terminal device based on the configuration information for the sidelink RSRP.

According to a second aspect, an embodiment of this application provides a first terminal device, including:
a sending module, configured to send configuration information for a sidelink reference signal received power RSRP to a second terminal device; and
a receiving module, configured to receive a measurement result of an RSRP reported by the second terminal device based on the configuration information for the sidelink RSRP.

According to a third aspect, an embodiment of this application provides a terminal device, including a memory, a processor, and a computer program that is stored in the memory and that can be run on the processor, where when the computer program is executed by the processor, the steps of the method according to the first aspect are implemented.

According to a fourth aspect, an embodiment of this application provides a computer-readable storage medium, where the computer-readable storage medium stores a computer program, and when the computer program is executed by a processor, the steps of the method according to the first aspect are implemented.

According to a fifth aspect, an embodiment of this application provides a measurement reporting method, where the method is applied to a second terminal device and includes:
receiving configuration information for a sidelink reference signal received power RSRP sent by a first terminal device; and
reporting a measurement result of an RSRP according to the configuration information for the sidelink RSRP.

According to a sixth aspect, an embodiment of this application provides a second terminal device, including:
a receiving module, configured to receive configuration information for a sidelink reference signal received power RSRP sent by a first terminal device; and
a reporting module, configured to report a measurement result of an RSRP according to the configuration information for the sidelink RSRP.

According to a seventh aspect, an embodiment of this application provides a terminal device, including a memory, a processor, and a computer program that is stored in the memory and that can be run on the processor, where when the computer program is executed by the processor, the steps of the method according to the fifth aspect are implemented.

According to an eighth aspect, an embodiment of this application provides a computer-readable storage medium, where the computer-readable storage medium stores a computer program, and when the computer program is executed by a processor, the steps of the method according to the fifth aspect are implemented.

According to a ninth aspect, an embodiment of this application provides a measurement reporting method, where the method is applied to a network device and includes:
setting configuration information for a sidelink reference signal received power RSRP; and
sending the configuration information for the sidelink RSRP to a first terminal device, where the configuration information for the sidelink RSRP is used for a second terminal device to report a measurement result of an RSRP, after being sent by the first terminal device to the second terminal device.

According to a tenth aspect, an embodiment of this application provides a network device, including:

a configuring module, configured to set configuration information for a sidelink reference signal received power RSRP; and a sending module, configured to send the configuration information for the sidelink RSRP to a first terminal device, where the configuration information for the sidelink RSRP is used for a second terminal device to report a measurement result of an RSRP, after being sent by the first terminal device to the second terminal device.

According to an eleventh aspect, an embodiment of this application provides a network device, including a memory, a processor, and a computer program that is stored in the memory and that can be run on the processor, where when the computer program is executed by the processor, the steps of the method according to the ninth aspect are implemented.

According to a twelfth aspect, an embodiment of this application provides a computer-readable storage medium, where the computer-readable storage medium stores a computer program, and when the computer program is executed by a processor, the steps of the method according to the ninth aspect are implemented.

In this embodiment of this application, the first terminal device between the sending device and the receiving device communicating through the sidelink sends the configuration information for the sidelink reference signal received power RSRP to the second terminal device between the sending device and the receiving device. Further, the first terminal device can receive the measurement result of the RSRP reported by the second terminal device according to the configuration information for the sidelink RSRP. This way, reporting of the RSRP is triggered through a related configuration of the sidelink RSRP, so that a sidelink can support the reporting of the RSRP, and the first terminal device, as the sending device, can know the latest channel state information, so as to better adjust a sending parameter.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions of this application may be applied to various communications systems, such as a Global System of Mobile Communication (GSM), a Code Division Multiple Access (CDMA) system, Wideband Code Division Multiple Access (WCDMA), a General Packet Radio Service (GPRS), (Long Term Evolution Advanced (LTE-A), and new radio (NR).

User equipment UE, also referred to as a terminal device (Mobile Terminal), mobile user equipment, or the like, may communicate with one or more core networks through a Radio Access Network (RAN). The user equipment may be a terminal device, such as a mobile phone (or referred to as a "cellular" phone) and a computer with the terminal device. For example, the user equipment may be a portable, pocket-sized, handheld, computer built-in, or in-vehicle mobile apparatus, which exchanges a language and/or data with the radio access network.

A network device, also referred to as a base station, may be a Base Transceiver Station (BTS) in GSM or CDMA, a NodeB in WCDMA, an evolutional Node B (eNB, or e-NodeB) in LTE, or a 5G gNodeB (gNB), which is not limited in the embodiments of this application. However, for ease of description, the following embodiments use the gNB as an example for description.

Therefore, a new scheme for reporting a measurement is urgently needed, so that a sidelink can support reporting of an RSRP.

The following describes in detail the technical solutions provided in the embodiments of this application with reference to the accompanying drawings.

Figure 1:
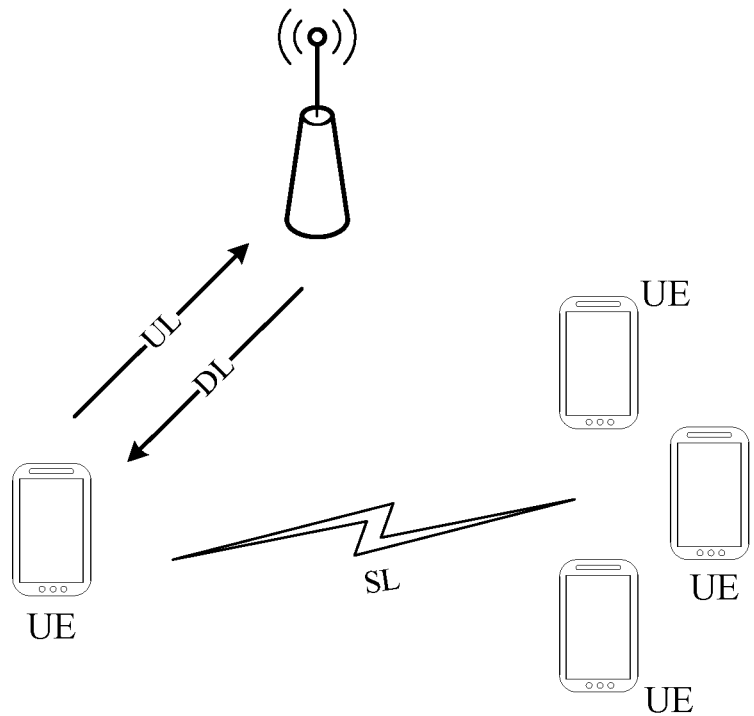
FIG. 1 is a schematic diagram of different types of communication links in the related art.
Figure 2:
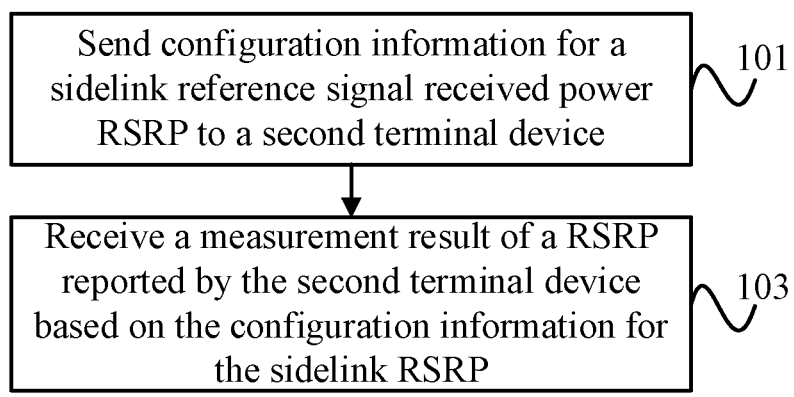
FIG. 2 is a schematic flowchart of a measurement reporting method according to an embodiment of this application.

Referring to FIG. 2, an embodiment of this application provides a measurement reporting method. The method is performed by a sending device, that is, a first terminal device, between a sending device and a receiving device that can communicate through a bypass link. The method includes the following steps.

Step 101: Send configuration information for a sidelink reference signal received power RSRP to a second terminal device.

Step 103: Receive a measurement result of an RSRP reported by the second terminal device based on the configuration information for the sidelink RSRP.

In this embodiment of this application, the first terminal device between the sending device and the receiving device communicating through the sidelink sends the configuration information for the sidelink reference signal received power RSRP to the second terminal device between the sending device and the receiving device. Further, the first terminal device can receive the measurement result of the RSRP reported by the second terminal device according to the configuration information for the sidelink RSRP. This way, reporting of the RSRP is triggered through a related configuration of the sidelink RSRP, so that a sidelink can support the reporting of the RSRP, and the first terminal device, as the sending device, can know the latest channel state information, so as to better adjust a sending parameter.

In some embodiments, in the measurement reporting method according to this embodiment of this application, after step 103, the method may further include the following content:

sending the measurement result of the RSRP to a network device.

In some embodiments, in the measurement reporting method according to this embodiment of this application, before the sending the measurement result of the RSRP to a network device, the following content may be further included:

receiving configuration information transmitted through a Uu interface and corresponding to the sidelink RSRP sent by the network device.

Further, in some embodiments, the step of the sending the measurement result of the RSRP to a network device may be performed as follows:

sending the measurement result of the RSRP to the network device according to a target resource and the configuration information transmitted through the Uu interface.

It can be understood that in order to ensure smooth communication between the first terminal device and a network device to which the first terminal device belongs, the configuration information transmitted through the Uu interface and corresponding to the sidelink RSRP configured by the network device for the first terminal device is received in advance, so that the first terminal device forwards, according to a corresponding resource and the configuration information transmitted through the Uu interface, to the network device the measurement result of the RSRP reported by the second terminal device.

Further, in some embodiments, the target resource includes at least one of the following:

a pre-allocated resource;

a resource dynamically sent by the network device through physical layer L1 signaling or media access control MAC; or a resource obtained based on a resource request sent to the network device.

In some embodiments, in the measurement reporting method according to this embodiment of this application, before step 101, the following content may be further included:

determining the configuration information for the sidelink RSRP according to pre-configured information or a stipulation in a protocol; or receiving the configuration information for the sidelink RSRP sent by a network device, where the network device is a network device to which the first terminal device belongs.

It can be understood that, on the one hand, the configuration information for the sidelink RSRP may be RSRP-related configuration determined, by the first terminal device itself, to be sent to the second terminal device. On the other hand, the configuration information for the sidelink RSRP may be RSRP related configuration obtained by the first terminal device from the network device to which the first terminal device belongs.

In some embodiments, in the measurement reporting method according to this embodiment of this application, if the configuration information for the sidelink RSRP is received from the network device to which the first terminal device belongs, the step of the receiving the configuration information for the sidelink RSRP sent by the network device may be specifically performed as follows:

receiving the configuration information for the sidelink RSRP sent by the network device through radio resource control RRC signaling or a system information block SIB message.

In some embodiments, in the measurement reporting method according to this embodiment of this application, the step 101 may be specifically performed as follows:

sending the configuration information for the sidelink RSRP to the second terminal device through RRC signaling of a PC5 interface.

In some embodiments, in the measurement reporting method according to this embodiment of this application, the configuration information for the sidelink RSRP includes at least one of the following:

a cycle for RSRP reporting;

a threshold for RSRP reporting; or a time interval for the RSRP measurement.

It can be understood that different manners for reporting the measurement result of the RSRP can be implemented through specific content of the foregoing configuration information for the sidelink RSRP.

Specifically, the cycle for RSRP reporting may be used for the second terminal device to periodically report the measurement result of the RSRP. That is, the measurement result of the RSRP is reported once in each cycle for RSRP reporting.

The threshold for RSRP reporting may be used for the second terminal device to report the measurement result of the RSRP semi-persistently or aperiodically. That is, the measurement result of the RSRP is reported once every time the measurement result of the RSRP reaches a configured threshold for RSRP reporting.

Specifically, the threshold for RSRP reporting and the time interval for the RSRP measurement may be used for the second terminal device to report the measurement result of the RSRP semi-persistently or aperiodically. That is, if the measurement result of the RSRP reaches the threshold for RSRP reporting and remains above the threshold for RSRP reporting within the time interval for the RSRP measurement, the measurement result of the RSRP is reported. That is to say, if the measurement result of the RSRP can be kept at least above the threshold for RSRP reporting within a configured time interval for the RSRP measurement, the measurement result of the RSRP is reported once.

In some embodiments, in the measurement reporting method according to this embodiment of this application, in case that the configuration information for the sidelink RSRP includes the threshold for RSRP reporting and the time interval for the RSRP measurement, the configuration information for the sidelink RSRP further includes preset times that the measurement result of the RSRP reaches the threshold for RSRP reporting within the time interval for the RSRP measurement.

It can be understood that the threshold for RSRP reporting, the time interval for the RSRP measurement, and the preset times may be used for the second terminal device to report the measurement result of the RSRP semi-persistently or aperiodically. That is, if times for which the measurement result of the RSRP reaches the threshold for RSRP reporting within the time interval for the RSRP measurement is greater than the preset times, the measurement result of the RSRP is reported. That is to say, if the times for which the measurement result of the RSRP reaches a configured threshold for RSRP reporting within a certain time interval can reach configured preset times, such as five times, the measurement result of the RSRP is reported once.

In some embodiments, in the measurement reporting method according to this embodiment of this application, the configuration information for the sidelink RSRP may further include a quantity of RSRP reporting, such as measured reference signal granularity, a broadband, a narrowband, or a plurality of measurement values apart from at least one of the cycle for RSRP reporting, the threshold for RSRP reporting, or the time interval for the RSRP measurement.

In some embodiments, in the measurement reporting method according to this embodiment of this application, the configuration information for the sidelink RSRP may further include at least one of a quantity of RSRP reporting and a reference signal used for sidelink RSRP measurement apart from at least one of the cycle for RSRP reporting, the threshold for RSRP reporting, or the time interval for the RSRP measurement.

The reference signal used for sidelink RSRP measurement is triggered semi-persistently or aperiodically. Therefore, reporting of the measurement result of the RSRP on the sidelink may be dynamically controlled.

In some embodiments, in the measurement reporting method according to this embodiment of this application, the configuration information for the sidelink RSRP may further include at least one of a quantity of RSRP reporting, a reference signal used for the sidelink RSRP measurement, or a first resource for RSRP reporting apart from at least one of the cycle for RSRP reporting, the threshold for RSRP reporting, or the time interval for the RSRP measurement.

The first resource for RSRP reporting is used for the second terminal device to report the measurement result of the RSRP.

Further, the step 103 may be specifically performed as follows:
  receiving a measurement result of the RSRP reported by the second terminal device using the first resource for RSRP reporting.

It can be understood that by pre-allocation of a certain reporting resource for the second terminal device in advance, the second terminal device can directly use the resource for reporting, so as to prevent the second terminal device from performing a resource request, sensing, and other processes, thereby saving power consumption of the terminal device.

In some embodiments, in the measurement reporting method according to this embodiment of this application, the step 103 may be specifically performed as follows:
  receiving the measurement result of the RSRP reported by the second terminal device using a second resource for RSRP reporting.

Further, in some embodiments, in the measurement reporting method according to this embodiment of this application, the following content may be further included:
  receiving the second resource for RSRP reporting sent by the second terminal device, where the second resource for RSRP reporting is used to report the measurement result of the RSRP, and the second resource for RSRP reporting is requested by the second terminal device from the network device to which the second terminal device belongs.

It can be understood that knowing the second resource for RSRP reporting used by the second terminal device during reporting the measurement result of the RSRP can help to improve efficiency of RSRP reporting.

Figure 3:
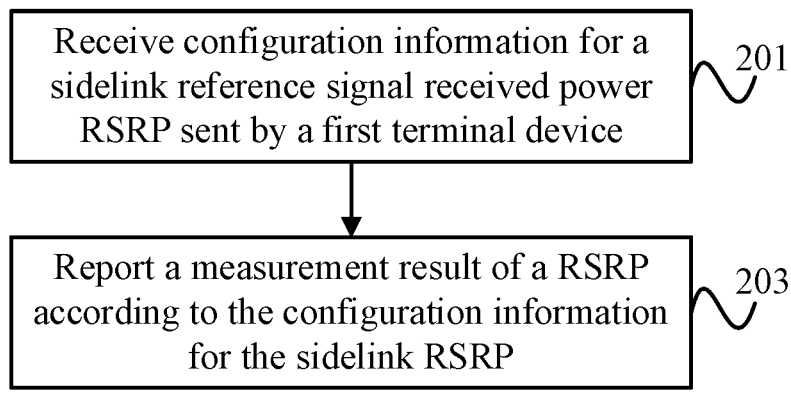
FIG. 3 is a schematic flowchart of a second measurement reporting method according to an embodiment of this application.

Referring to FIG. 3, an embodiment of this application provides a measurement reporting method. The method is performed by a receiving device, that is, a second terminal device, between a sending device and a receiving device that can communicate through a bypass link. The method includes the following steps.

Step 201: Receive configuration information for a sidelink reference signal received power RSRP sent by a first terminal device.

In some embodiments, the configuration information for the sidelink RSRP received from the first terminal device may be determined by the first terminal device based on pre-configured information or a stipulation in a protocol.

It can be understood that the configuration information for the sidelink RSRP is RSRP related configuration determined by the first terminal device itself.

In some embodiments, the configuration information for the sidelink RSRP received from the first terminal device may be sent to the first terminal device by a network device to which the first terminal device belongs.

It can be understood that the configuration information for the sidelink RSRP is RSRP related configuration obtained by the first terminal device from the network device to which the first terminal device belongs.

Step 203: Report a measurement result of an RSRP according to the configuration information for the sidelink RSRP.

In this embodiment of this application, after receiving the configuration information for the sidelink reference signal received power RSRP sent by the first terminal device between a sending device and a receiving device, the second terminal device between the sending device and the receiving device communicating through a sidelink can further report the measurement result of the RSRP according to the configuration information for the sidelink RSRP. This way, reporting of the RSRP is triggered through a related configuration of the sidelink RSRP, so that a sidelink can support the reporting of the RSRP, and the first terminal device, as the sending device, can know the latest channel state information, so as to better adjust a sending parameter.

In some embodiments, in the measurement reporting method according to this embodiment of this application, the step 201 may be specifically performed as follows:
  receiving the configuration information for the sidelink RSRP sent by the first terminal device through RRC signaling of a PC5 interface.

In some embodiments, in the measurement reporting method according to this embodiment of this application, the configuration information for the sidelink RSRP includes at least one of the following:
  a cycle for RSRP reporting;
  a threshold for RSRP reporting; or
  a time interval for the RSRP measurement.

Further, in some embodiments, in the measurement reporting method according to this embodiment of this application, it can be ensured, according to specific content of the configuration information for the sidelink RSRP, that different reporting manners for reporting the measurement result of the RSRP can be implemented.

In a specific embodiment, step 203 may be specifically implemented as follows: periodically reporting the measurement result of the RSRP according to the cycle for RSRP reporting.

It can be understood that the measurement result of the RSRP is reported once in every cycle for RSRP reporting.

In another specific embodiment, step 203 may be specifically implemented as follows: semi-persistently or aperiodically reporting the measurement result of the RSRP according to the threshold for RSRP reporting.

It can be understood that the measurement result of the RSRP is reported once every time the measurement result of the RSRP reaches a configured threshold for RSRP reporting.

In still another specific embodiment, step 203 may be specifically implemented as follows: semi-persistently or aperiodically reporting the measurement result of the RSRP according to the threshold for RSRP reporting and the time interval for the RSRP measurement.

Further, if the measurement result of the RSRP reaches the threshold for RSRP reporting and remains above the threshold for RSRP reporting within the time interval for the RSRP measurement, the measurement result of the RSRP is reported.

It can be understood that if the measurement result of the RSRP can remain at least above the threshold for RSRP reporting within a configured time interval for the RSRP measurement, the measurement result of the RSRP is reported once.

In some embodiments, in the measurement reporting method according to this embodiment of this application, the configuration information for the sidelink RSRP further includes preset times for which the measurement result of the RSRP reaches the threshold for RSRP reporting within the time interval for the RSRP measurement.

Further, the semi-persistently or aperiodically reporting the measurement result of the RSRP according to the threshold for RSRP reporting and the time interval for the RSRP measurement may be specifically implemented as follows:
  reporting the measurement result of the RSRP if the times for which the measurement result of the RSRP reaches the threshold for RSRP reporting is greater than the preset times within the time interval for the RSRP measurement.

It can be understood that if the times for which the measurement result of the RSRP reaches a configured threshold for RSRP reporting within a certain time interval can reach configured preset times, such as five times, the measurement result of the RSRP is reported once.

In some embodiments, in the measurement reporting method according to this embodiment of this application, the configuration information for the sidelink RSRP may further include a quantity of RSRP reporting, such as measured reference signal granularity, a broadband, a narrowband, or a plurality of measurement values apart from at least one of the cycle for RSRP reporting, the threshold for RSRP reporting, or the time interval for the RSRP measurement.

In some embodiments, in the measurement reporting method according to this embodiment of this application, the configuration information for the sidelink RSRP may further include at least one of a quantity of RSRP reporting and a reference signal used for sidelink RSRP measurement apart from at least one of the cycle for RSRP reporting, the threshold for RSRP reporting, or the time interval for the RSRP measurement.

The reference signal used for sidelink RSRP measurement is triggered semi-persistently or aperiodically. Therefore, reporting of the measurement result of the RSRP on the sidelink may be dynamically controlled.

In some embodiments, in the measurement reporting method according to this embodiment of this application, the configuration information for the sidelink RSRP may further include at least one of a quantity of RSRP reporting, a reference signal used for the sidelink RSRP measurement, or a first resource for RSRP reporting apart from at least one of the cycle for RSRP reporting, the threshold for RSRP reporting, or the time interval for the RSRP measurement.

The first resource for RSRP reporting is used for the second terminal device to report the measurement result of the RSRP.

It can be understood that by pre-allocation of a certain reporting resource for the second terminal device in advance, the second terminal device can directly use the resource for reporting, so as to prevent the second terminal device from performing a resource request, sensing, and other processes, thereby saving power consumption of the terminal device.

In some embodiments, in a specific embodiment of the measurement reporting method according to this application, step 203 may be specifically implemented as follows:
  reporting the measurement result of the RSRP to the first terminal device according to the configuration information for the sidelink RSRP.

It can be understood that the second terminal device can report the measurement result of the RSRP to the first terminal device according to a manner for RSRP reporting, the quantity of RSRP reporting, the reference signal used for the sidelink RSRP measurement, and the first resource for RSRP reporting that are indicated by the configuration information for the sidelink RSRP, and then the first terminal device can forward the measurement result of the RSRP to a network device to which the first terminal device belongs.

In some embodiments, the first resource for RSRP reporting may be further used by the second terminal device to report the measurement result of the RSRP to a network device to which the second terminal device belongs.

In some embodiments, in another specific embodiment of the measurement reporting method according to this application, before step 203, the following content may be further included:
  sending a request to the network device to which the second terminal device belongs to obtain a second resource for RSRP reporting.

Further, step 203 may be specifically performed as follows:
  reporting the measurement result of the RSRP according to the configuration information for the sidelink RSRP and the second resource for RSRP reporting.

It can be understood that the second terminal device can report the measurement result of the RSRP to the first terminal device according to the second resource for RSRP reporting requested by the network device to which the second terminal device belongs, and the manner for RSRP reporting, the quantity of RSRP reporting, the reference signal used for the sidelink RSRP measurement, and the like, that are indicated by the configuration information for the sidelink RSRP, and then the first terminal device can forward the measurement result of the RSRP to the network device to which the first terminal device belongs.

In some embodiments, the second resource for RSRP reporting may be further used by the second terminal device to report the measurement result of the RSRP to the network device to which the second terminal device belongs.

Further, in some embodiments, in the measurement reporting method according to this embodiment of this application, the following content may be further included:
  sending the first terminal device the second resource for RSRP reporting.

It can be understood that informing the first terminal device of the second resource for RSRP reporting to be used during reporting of the measurement result of the RSRP can help to improve efficiency of RSRP reporting.

In some embodiments, in the measurement reporting method according to this embodiment of this application, when the second terminal device is located in a coverage area of the network device to which the first terminal device belongs, the following content may be further included:

receiving the configuration information for the sidelink RSRP sent by the network device through radio resource control RRC signaling or a system information block SIB message, to complete reporting of the measurement result of the RSRP.

Figure 4:
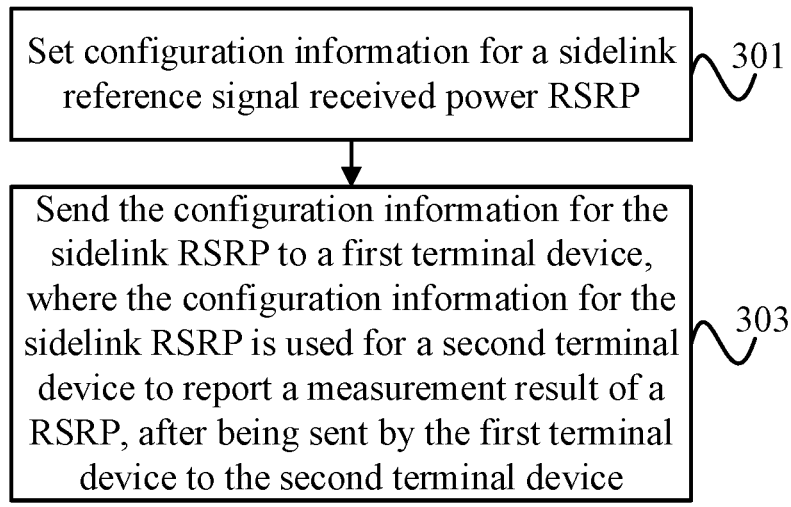
FIG. 4 is a schematic flowchart of a third measurement reporting method according to an embodiment of this application.

Referring to FIG. 4, an embodiment of this application provides a measurement reporting method. The method is performed by a sending device, that is, a network device of a first terminal device, between a sending device and a receiving device that communicate through a bypass link. The method includes the following steps.

Step 301: Set configuration information for a sidelink reference signal received power RSRP.

Step 303: Send the configuration information for the sidelink RSRP to the first terminal device, where the configuration information for the sidelink RSRP is used for the second terminal device to report the measurement result of the RSRP, after being sent by the first terminal device to the second terminal device.

In this embodiment of this application, the configuration information for the sidelink reference signal received power RSRP is configured for the first terminal device that is located in a coverage area of the network device and that is between a sending device and the receiving device communicating through a sidelink. Then, after the configuration information for the sidelink RSRP is sent to the first terminal device, the first terminal device can forward the configuration information to the second terminal device that communicates with the first terminal device through a sidelink, so that the second terminal device can report the measurement result of the RSRP according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter. In some embodiments, in the measurement reporting method according to this embodiment of this application, step 303 may be specifically performed as follows:

sending the configuration information for the sidelink RSRP to the first terminal device through radio resource control RRC signaling or a system information block SIB message.

In some embodiments, in the measurement reporting method according to this embodiment of this application, the configuration information for the sidelink RSRP includes at least one of the following:

a cycle for RSRP reporting;
a threshold for RSRP reporting; or
a time interval for the RSRP measurement.

It can be understood that different manners for reporting the measurement result of the RSRP can be implemented through specific content of the foregoing configuration information for the sidelink RSRP.

Specifically, the cycle for RSRP reporting may be used to periodically report the measurement result of the RSRP. That is, the measurement result of the RSRP is reported once in each cycle for RSRP reporting.

The threshold for RSRP reporting may be used to report the measurement result of the RSRP semi-persistently or aperiodically. That is, the measurement result of the RSRP is reported once every time the measurement result of the RSRP reaches a configured threshold for RSRP reporting.

Specifically, the threshold for RSRP reporting and the time interval for the RSRP measurement may be used to report the measurement result of the RSRP semi-persistently or aperiodically. That is, if the measurement result of the RSRP reaches the threshold for RSRP reporting and remains above the threshold for RSRP reporting within the time interval for the RSRP measurement, the measurement result of the RSRP is reported. That is to say, if the measurement result of the RSRP can be kept at least above the threshold for RSRP reporting within a configured time interval for the RSRP measurement, the measurement result of the RSRP is reported once.

In some embodiments, in the measurement reporting method according to this embodiment of this application, in case that the configuration information for the sidelink RSRP includes the threshold for RSRP reporting and the time interval for the RSRP measurement, the configuration information for the sidelink RSRP further includes preset times for which the measurement result of the RSRP reaches the threshold for RSRP reporting within the time interval for the RSRP measurement.

It can be understood that the threshold for RSRP reporting, the time interval for the RSRP measurement, and the preset times may be used for the second terminal device to report the measurement result of the RSRP semi-persistently or aperiodically. That is, if the times for which the measurement result of the RSRP reaches the threshold for RSRP reporting within the time interval for the RSRP measurement is greater than the preset times, the measurement result of the RSRP is reported. That is to say, if the times for which the measurement result of the RSRP reaches a configured threshold for RSRP reporting within a certain time interval can reach configured preset times, such as five times, the measurement result of the RSRP is reported once.

In some embodiments, in the measurement reporting method according to this embodiment of this application, the configuration information for the sidelink RSRP includes at least one of the following:

a quantity of RSRP reporting;
a resource for RSRP reporting; or
a reference signal used for sidelink RSRP measurement, where the reference signal is triggered semi-persistently or aperiodically.

In some embodiments, in the measurement reporting method according to this embodiment of this application, the configuration information for the sidelink RSRP may further include a quantity of RSRP reporting, such as measured reference signal granularity, a broadband, a narrowband, or a plurality of measurement values apart from at least one of the cycle for RSRP reporting, the threshold for RSRP reporting, or the time interval for the RSRP measurement.

In some embodiments, in the measurement reporting method according to this embodiment of this application, the configuration information for the sidelink RSRP may further include at least one of a quantity of RSRP reporting and a reference signal used for sidelink RSRP measurement apart from at least one of the cycle for RSRP reporting, the threshold for RSRP reporting, or the time interval for the RSRP measurement.

The reference signal used for sidelink RSRP measurement is triggered semi-persistently or aperiodically. Therefore, reporting of the measurement result of the RSRP on the sidelink may be dynamically controlled.

In some embodiments, in the measurement reporting method according to this embodiment of this application, the configuration information for the sidelink RSRP may further include at least one of a quantity of RSRP reporting, a reference signal used for the sidelink RSRP measurement, or a first resource for RSRP reporting apart from at least one of the cycle for RSRP reporting, the threshold for RSRP reporting, or the time interval for the RSRP measurement.

The first resource for RSRP reporting is used for the second terminal device to report the measurement result of the RSRP.

In some embodiments, in the measurement reporting method according to this embodiment of this application, after step 303, the method may further include the following content:

receiving the measurement result of the RSRP sent by the first terminal device and reported by the second terminal device.

Specifically, the step of receiving the measurement result of the RSRP sent by the first terminal device and reported by the second terminal device may be specifically performed as follows:

receiving the measurement result of the RSRP reported by the second terminal device and sent by the first terminal device according to a target resource and configuration information transmitted through a Uu interface and corresponding to the sidelink RSRP.

The configuration information transmitted through the Uu interface is sent to the first terminal device by the network device before the measurement result of the RSRP is received.

It can be understood that in order to ensure smooth communication between the first terminal device and a network device to which the first terminal device belongs, the configuration information transmitted through the Uu interface and corresponding to the sidelink RSRP configured by the network device for the first terminal device is received in advance, so that the first terminal device forwards, according to the configuration information transmitted through the Uu interface and a corresponding resource, to the network device the measurement result of the RSRP reported by the second terminal device.

Further, in some embodiments, the target resource includes at least one of the following:

a pre-allocated resource;
a resource dynamically sent by the network device through physical layer L1 signaling or media access control MAC; or
a resource obtained based on a resource request sent to the network device.

In some embodiments, in the measurement reporting method according to this embodiment of this application, when the second terminal device is located in a coverage area of the network device, the following content may be further included:

sending the configuration information for the sidelink RSRP to the second terminal device through radio resource control RRC signaling or a system information block SIB message to complete reporting of the measurement result of the RSRP.

Figure 5:
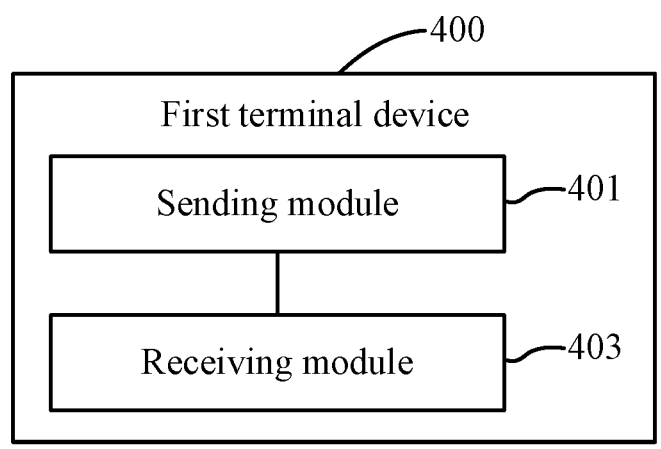
FIG. 5 is a schematic structural diagram of a first terminal device according to an embodiment of this application.

As shown in FIG. 5, an embodiment of this application provides a first terminal device 400. The terminal device 400 includes:

a sending module 401, configured to send configuration information for a sidelink reference signal received power RSRP to a second terminal device; and
a receiving module 403, configured to receive a measurement result of a RSRP reported by the second terminal device based on the configuration information for the sidelink RSRP.

In some embodiments, the first terminal device 400 according to this embodiment of this application may further include:

a determining module, configured to determine the configuration information for the sidelink RSRP according to pre-configured information or a stipulation in a protocol before the configuration information for the sidelink reference signal received power RSRP is sent to the second terminal device; or
the receiving module 403 may be further configured to receive, before the configuration information for the sidelink reference signal received power RSRP is sent to the second terminal device, the configuration information for the sidelink RSRP sent by a network device, where the network device is a network device to which the first terminal device belongs.

In some embodiments, in the first terminal device 400 according to this embodiment of this application, the receiving module 403 may be specifically configured to:

receive the configuration information for the sidelink RSRP sent by the network device through radio resource control RRC signaling or a system information block SIB message.

In some embodiments, in the first terminal device 400 according to this embodiment of this application, the sending module 401 may be specifically configured to:

send the configuration information for the sidelink RSRP to the second terminal device through RRC signaling of a PC5 interface.

In some embodiments, in the first terminal device 400 according to this embodiment of this application, the configuration information for the sidelink RSRP includes at least one of the following:

a cycle for RSRP reporting;
a threshold for RSRP reporting; or
a time interval for the RSRP measurement.

In some embodiments, in the first terminal device 400 according to this embodiment of this application, in case that the configuration information for the sidelink RSRP includes the threshold for RSRP reporting and the time interval for the RSRP measurement, the configuration information for the sidelink RSRP further includes preset times for which the measurement result of the RSRP reaches the threshold for RSRP reporting within the time interval for the RSRP measurement.

In some embodiments, in the first terminal device 400 according to this embodiment of this application, the configuration information for the sidelink RSRP includes a quantity of RSRP reporting.

In some embodiments, in the first terminal device 400 according to this embodiment of this application, the configuration information for the sidelink RSRP includes a reference signal used for sidelink RSRP measurement, and the reference signal is triggered semi-persistently or aperiodically.

In some embodiments, in the first terminal device 400 according to this embodiment of this application, the configuration information for the sidelink RSRP includes a first resource for RSRP reporting. The first resource for RSRP reporting is used for the second terminal device to report the measurement result of the RSRP.

In some embodiments, in the first terminal device 400 according to this embodiment of this application, the sending module 401 may be further configured to send the measurement result of the RSRP to the network device.

In some embodiments, in the first terminal device 400 according to this embodiment of this application, the receiving module 403 may be further configured to:

receive, before the measurement result of the RSRP is sent to the network device, configuration information transmitted through a Uu interface and corresponding to the sidelink RSRP sent by the network device.

The sending module 401 may be specifically configured to:

send the measurement result of the RSRP to the network device according to a target resource and the configuration information transmitted through the Uu interface.

In some embodiments, in the first terminal device 400 according to this embodiment of this application, the target resource includes one of the following:

a pre-allocated resource;
a resource dynamically sent by the network device through L1 signaling or media access control MAC; or
a resource obtained based on a resource request sent to the network device.

In some embodiments, in the first terminal device 400 according to this embodiment of this application, the receiving module 403 may be further configured to:

receive a second resource for RSRP reporting sent by the second terminal device, where the second resource for RSRP reporting is a resource requested, to a network device to which the second terminal device belongs, by the second terminal device to report the measurement result of the RSRP.

It can be understood that, through the first terminal device 400 according to this embodiment of this application, the foregoing measurement reporting method performed by the first terminal device 400 can be implemented. Relevant explanations about the measurement reporting method all apply to the first terminal device 400 and are not described herein again.

In this embodiment of this application, the first terminal device between the sending device and the receiving device communicating through the sidelink sends the configuration information for the sidelink reference signal received power RSRP to the second terminal device between the sending device and the receiving device. Further, the first terminal device can receive the measurement result of the RSRP reported by the second terminal device according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

Figure 6:
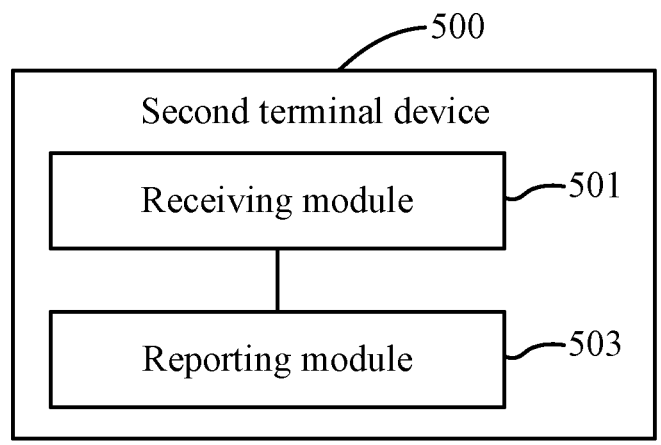
FIG. 6 is a schematic structural diagram of a second terminal device according to an embodiment of this application.

As shown in FIG. 6, an embodiment of this application provides a second terminal device 500. The second terminal device 500 includes:

a receiving module 501, configured to receive configuration information for a sidelink reference signal received power RSRP sent by a first terminal device; and
a reporting module 503, configured to report a measurement result of an RSRP according to the configuration information for the sidelink RSRP.

In some embodiments, in the second terminal device 500 according to this embodiment of this application, the receiving module 501 may be specifically configured to:

receive the configuration information for the sidelink RSRP sent by the first terminal device through RRC signaling of a PC5 interface.

In some embodiments, in the second terminal device 500 according to this embodiment of this application, the configuration information for the sidelink RSRP is determined based on pre-configured information or a stipulation in a protocol. Alternatively, the configuration information for the sidelink RSRP is sent to the first terminal device by a network device to which the first terminal device belongs.

In some embodiments, in the second terminal device 500 according to this embodiment of this application, the configuration information for the sidelink RSRP includes at least one of the following:

a cycle for RSRP reporting;
a threshold for RSRP reporting; or
a time interval for the RSRP measurement.

In some embodiments, in the second terminal device 500 according to this embodiment of this application, the reporting module 503 is specifically configured to implement one of the following:

periodically reporting the measurement result of the RSRP according to the cycle for RSRP reporting;
semi-persistently or aperiodically reporting the measurement result of the RSRP according to the threshold for RSRP reporting; or
semi-persistently or aperiodically reporting the measurement result of the RSRP according to the threshold for RSRP reporting and the time interval for the RSRP measurement.

In some embodiments, in the second terminal device 500 according to this embodiment of this application, the reporting module 503 may be specifically configured to:

report the measurement result of the RSRP if the measurement result of the RSRP reaches the threshold for RSRP reporting and remains above the threshold for RSRP reporting within the time interval for the RSRP measurement.

In some embodiments, in the second terminal device 500 according to this embodiment of this application, the configuration information for the sidelink RSRP further includes preset times for which the measurement result of the RSRP reaches the threshold for RSRP reporting within the time interval for the RSRP measurement.

The reporting module 503 may be specifically configured to:

report the measurement result of the RSRP if the times for which the measurement result of the RSRP reaches the threshold for RSRP reporting is greater than the preset times within the time interval for the RSRP measurement.

In some embodiments, in the second terminal device 500 according to this embodiment of this application, the configuration information for the sidelink RSRP includes a quantity of RSRP reporting.

In some embodiments, in the second terminal device 500 according to this embodiment of this application, the configuration information for the sidelink RSRP includes a reference signal used for sidelink RSRP measurement, and the reference signal is triggered semi-persistently or aperiodically.

In some embodiments, in the second terminal device 500 according to this embodiment of this application, the configuration information for the sidelink RSRP includes a first resource for RSRP reporting. The first resource for RSRP reporting is used for the second terminal device to report the measurement result of the RSRP.

In some embodiments, in the second terminal device 500 according to this embodiment of this application, the reporting module 503 may be specifically configured to:

report the measurement result of the RSRP to the first terminal device according to the configuration information for the sidelink RSRP.

In some embodiments, the second terminal device 500 according to this embodiment of this application may further include:

an obtaining module, configured to send, before the measurement result of the RSRP is reported according to the configuration information for the sidelink RSRP, a request to a network device to which the second terminal device belongs to obtain a second resource for RSRP reporting.

The reporting module 503 may be specifically configured to:

report the measurement result of the RSRP according to the configuration information for the sidelink RSRP and the second resource for RSRP reporting.

In some embodiments, the second terminal device 500 according to this embodiment of this application may further include:

a sending module, configured to send the first terminal device the second resource for RSRP reporting.

It can be understood that, through the second terminal device 500 according to this embodiment of this application, the foregoing measurement reporting method performed by the second terminal device 500 can be implemented. Relevant explanations about the measurement reporting method all apply to the second terminal device 500 and are not described herein again.

In this embodiment of this application, after receiving the configuration information for the sidelink reference signal received power RSRP sent by the first terminal device between a sending device and a receiving device, the second terminal device between the sending device and the receiving device communicating through a sidelink can further report the measurement result of the RSRP according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

Figure 7:
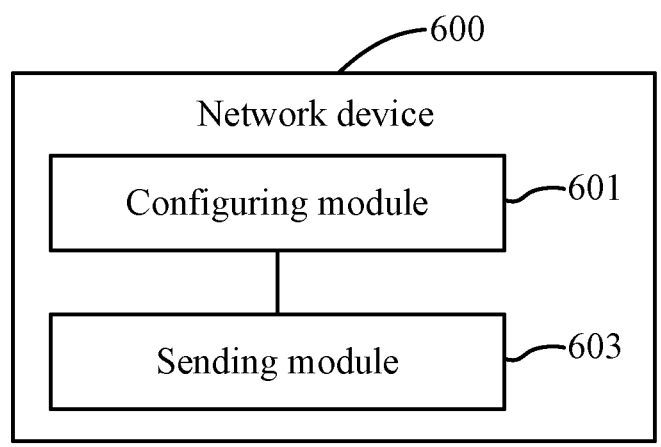
FIG. 7 is a schematic structural diagram of a network device according to an embodiment of this application.

Referring to FIG. 7, an embodiment of this application provides a network device 600, including:

a configuring module 601, configured to set configuration information for a sidelink reference signal received power RSRP; and a sending module 603, configured to send the configuration information for the sidelink RSRP to the first terminal device, where the configuration information for the sidelink RSRP is used for the second terminal device to report the measurement result of the RSRP, after being sent by the first terminal device to the second terminal device.

In some embodiments, in the network device 600 according to this embodiment of this application, the sending module 603 may be specifically configured to:

send the configuration information for the sidelink RSRP to the first terminal device through radio resource control RRC signaling or a system information block SIB message.

In some embodiments, in the network device 600 according to this embodiment of this application, the configuration information for the sidelink RSRP includes at least one of the following:

a quantity of RSRP reporting;
a resource for RSRP reporting; or a reference signal used for sidelink RSRP measurement, where the reference signal is triggered semi-persistently or aperiodically.

In some embodiments, in the network device 600 according to this embodiment of this application, the configuration information for the sidelink RSRP includes at least one of the following: a cycle for RSRP reporting; a threshold for RSRP reporting; or a time interval for the RSRP measurement.

In some embodiments, in the network device 600 according to this embodiment of this application, in case that the configuration information for the sidelink RSRP includes the threshold for RSRP reporting and the time interval for the RSRP measurement, the configuration information for the sidelink RSRP further includes preset times for which the measurement result of the RSRP reaches the threshold for RSRP reporting within the time interval for the RSRP measurement.

In some embodiments, the network device 600 according to this embodiment of this application may further include:

a receiving module, configured to receive the measurement result of the RSRP sent by the first terminal device and reported by the second terminal device.

It can be understood that, through the network device 600 according to this embodiment of this application, the foregoing measurement reporting method performed by the network device 600 can be implemented. Relevant explanations about the measurement reporting method all apply to the network device 600 and are not described herein again.

In this embodiment of this application, the configuration information for the sidelink reference signal received power RSRP is configured for the first terminal device that is located in a coverage area of the network device and that is between a sending device and the receiving device communicating through a sidelink. Then, after the configuration information for the sidelink RSRP is sent to the first terminal device, the first terminal device can forward the configuration information to the second terminal device that communicates with the first terminal device through a sidelink, so that the second terminal device can report the measurement result of the RSRP according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

Figure 8:
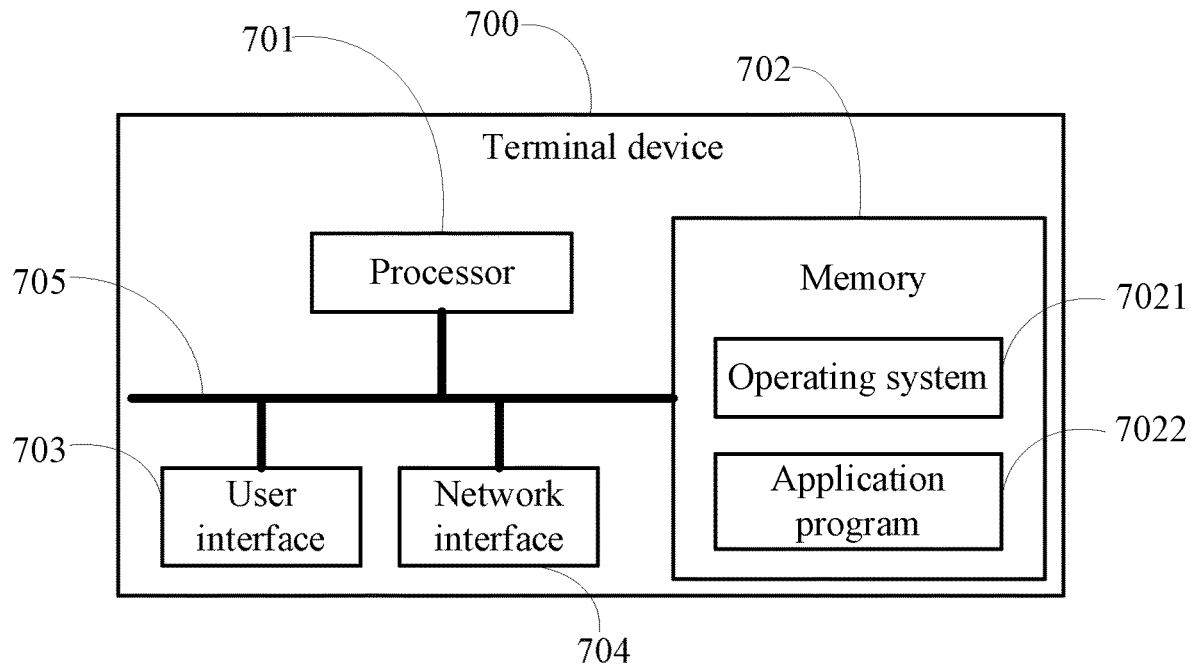
FIG. 8 is a schematic structural diagram of a terminal device according to an embodiment of this application.

FIG. 8 is a block diagram of a terminal device according to another embodiment of this application. The terminal device 700 shown in FIG. 8 includes at least one processor 701, a memory 702, at least one network interface 704, and a user interface 703. All components in the terminal device 700 are coupled together through a bus system 705. It can be understood that the bus system 705 is configured to implement connection and communication between these components. In addition to a data bus, the bus system 705 further includes a power bus, a control bus, and a status signal bus. However, for clear description, various buses are marked as the bus system 705 in FIG. 8.

The user interface 703 may include a display, a keyboard, or a clicking device, for example, a mouse, a trackball, a touch panel, or a touchscreen.

It can be understood that the memory 702 in this embodiment of this application may be a volatile memory or a nonvolatile memory, or may include both a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. By way of example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 702 in the system and the method that are described in the embodiments of this application is to include but is not limited to these memories and a memory of any other proper type.

In some implementations, the memory 702 stores the following elements: an executable module or a data structure, a subset thereof, or an extension set thereof: an operating system 7021 and an application program 7022.

The operating system 7021 includes various system programs, for example, a framework layer, a kernel library layer, and a driver layer, and is configured to implement various basic services and process a hardware-based task. The application program 7022 includes various application programs, for example, a media player and a browser, and is used to implement various application services. A program for implementing the method according to this embodiment of this application may be included in the application program 7022.

In this embodiment of this application, the terminal device 700 further includes a computer program that is stored in the memory 702 and that can be run on the processor 701.

When the computer program is executed by the processor 701, the following steps may be implemented:

sending configuration information for a sidelink reference signal received power RSRP to a second terminal device; and receiving a measurement result of a RSRP reported by the second terminal device based on the configuration information for the sidelink RSRP.

In this embodiment of this application, the first terminal device between the sending device and the receiving device communicating through the sidelink sends the configuration information for the sidelink reference signal received power RSRP to the second terminal device between the sending device and the receiving device. Further, the first terminal device can receive the measurement result of the RSRP reported by the second terminal device according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

When the computer program is executed by the processor 701, the following steps may be further implemented:

receiving configuration information for a sidelink reference signal received power RSRP sent by a first terminal device; and reporting the measurement result of the RSRP according to the configuration information for the sidelink RSRP.

In this embodiment of this application, after receiving the configuration information for the sidelink reference signal received power RSRP sent by the first terminal device between a sending device and a receiving device, the second terminal device between the sending device and the receiving device communicating through a sidelink can further report the measurement result of the RSRP according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

The method according to the foregoing embodiments of this application may be applied to the processor 701, or may be implemented by the processor 701. The processor 701 may be an integrated circuit chip having a signal processing capability. During implementation, each step of the foregoing method may be completed by using an integrated logic circuit of hardware in the processor 701 or an instruction in a form of software. The processor 701 may be a general-purpose processor, a Digital Signal Processor (DSP), an Application-Specific Integrated Circuit (ASIC), a Field Programmable Gate Array (FPGA), or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 702, and the processor 701 reads information in the memory 702 and completes the steps in the foregoing method in combination with hardware of the processor. Specifically, the computer-readable storage medium stores a computer program, and when the computer program is executed by the processor 701, the steps of the foregoing embodiment of the measurement reporting method are implemented.

It can be understood that the embodiments described in the embodiments of this application may be implemented by hardware, software, firmware, middleware, microcode, or a combination thereof. For implementation with hardware, the processing unit may be implemented in one or more Application Specific Integrated Circuit (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, another electronic unit for implementing the functions of this application, or a combination thereof.

For implementation with software, the technologies in the embodiments of this application may be implemented through modules (for example, procedures or functions) that perform the functions in the embodiments of this application. A software code may be stored in the memory and executed by the processor. The memory may be implemented in the processor or outside the processor.

The terminal device 700 can implement each process implemented by the terminal device in the foregoing embodiments. To avoid repetition, details are not described herein again.

Figure 9:
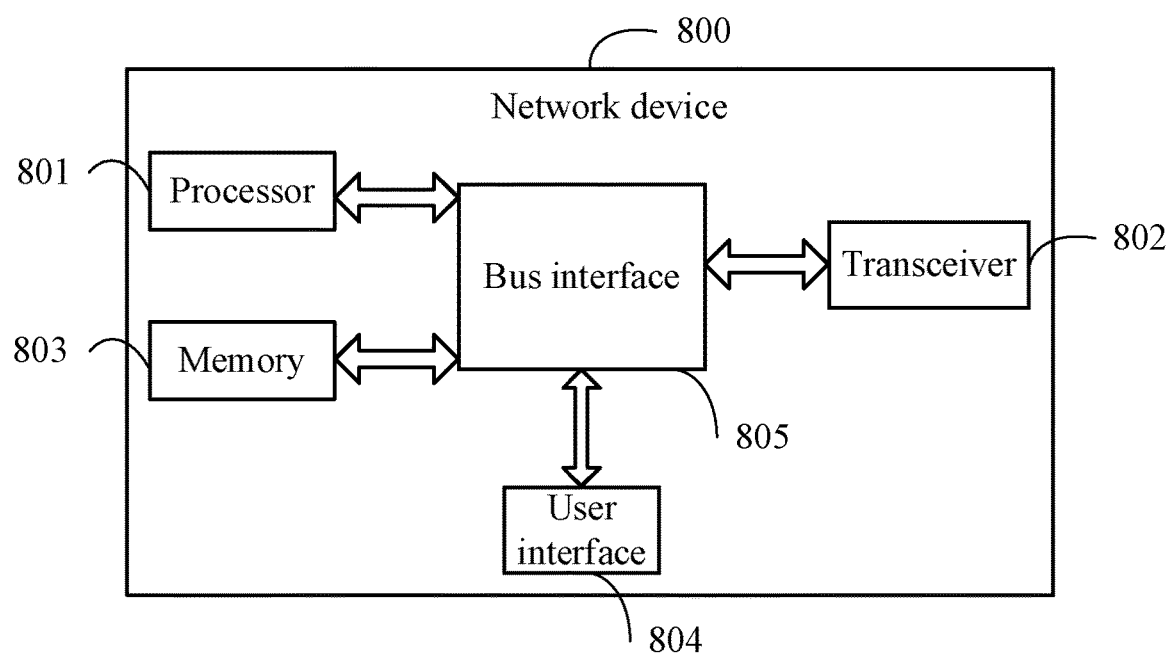
FIG. 9 is a schematic structural diagram of a second network device according to an embodiment of this application.

Referring to FIG. 9, FIG. 9 is a structural diagram of a network device according to an embodiment of this application, so that details of the foregoing measurement reporting method can be implemented, and the same effect can be achieved. As shown in FIG. 9, the network device 800 includes a processor 801, a transceiver 802, a memory 803, a user interface 804, and a bus interface 805.

In this embodiment of this application, the network device 800 further includes a computer program that is stored in the memory 803 and that can be run on the processor 801, and when the computer program is executed by the processor 801, the following steps are implemented:

setting configuration information for a sidelink reference signal received power RSRP; and sending the configuration information for the sidelink RSRP to a first terminal device, where the configuration information for the sidelink RSRP is used for a second terminal device to report a measurement result of an RSRP, after being sent by the first terminal device to the second terminal device.

In FIG. 9, a bus architecture may include any quantity of interconnected buses and bridges, which are specifically connected together by one or more processors represented by the processor 801 and various circuits of a memory represented by the memory 803. The bus architecture may further connect various other circuits such as peripheral devices, voltage regulators, and power management circuits. These are all known in the art, and therefore, no further description is provided herein. The bus interface 805 provides an interface. The transceiver 802 may be a plurality of components. To be specific, the transceiver includes a transmitter and a receiver, and provides a unit configured to communicate with various other apparatuses on a transmission medium. For different user equipment, a user interface 804 may be further an interface capable of connecting externally and internally a required device. The connected device includes but is not limited to a keypad, a display, a speaker, a microphone, a joystick, and the like.

In this embodiment of this application, the configuration information for the sidelink reference signal received power RSRP is configured for the first terminal device that is located in a coverage area of the network device and that is between a sending device and the receiving device communicating through a sidelink. Then, after the configuration information for the sidelink RSRP is sent to the first terminal device, the first terminal device can forward the configuration information to the second terminal device that communicates with the first terminal device through a sidelink, so that the second terminal device can report the measurement result of the RSRP according to the configuration information for the sidelink RSRP. This way, reporting of the RSRP is triggered through related configuration of the sidelink RSRP, so that a sidelink can support the reporting of the RSRP, and the first terminal device, as the sending device, can know the latest channel state information, so as to better adjust a sending parameter.

The processor 801 is responsible for managing the bus architecture and common processing, and the memory 803 may store data used when the processor 801 performs an operation.

In some embodiments, an embodiment of this application further provides a terminal device, including a processor, a memory, and a computer program that is stored in the memory and that can be run on the processor. When the computer program is executed by the processor, processes of the foregoing embodiments of the measurement reporting method, applied to a first terminal device, are implemented, and a same technical effect can be achieved. To avoid repetition, details are not described herein again.

An embodiment of this application further provides a computer-readable storage medium. The computer-readable storage medium stores a computer program, and when the computer program is executed by a processor, the processes of the foregoing embodiments of the measurement reporting method, applied to a first terminal device, are implemented, and a same technical effect can be achieved. To avoid repetition, details are not described herein again. The computer readable storage medium is a Read-Only Memory (ROM), a Random Access Memory (RAM), a magnetic disk, an optical disc, or the like.

In some embodiments, an embodiment of this application further provides a terminal device, including a processor, a memory, and a computer program that is stored in the memory and that can be run on the processor. When the computer program is executed by the processor, processes of the foregoing embodiments of the measurement reporting method, applied to a second terminal device, are implemented, and a same technical effect can be achieved. To avoid repetition, details are not described herein again.

An embodiment of this application further provides a computer-readable storage medium. The computer-readable storage medium stores a computer program, and when the computer program is executed by a processor, the processes of the foregoing embodiments of the measurement reporting method, applied to a second terminal device, are implemented, and a same technical effect can be achieved. To avoid repetition, details are not described herein again. The computer readable storage medium is a Read-Only Memory (ROM), a Random Access Memory (RAM), a magnetic disk, an optical disc, or the like.

In some embodiments, an embodiment of this application further provides a network device, including a processor, a memory, and a computer program that is stored in the memory and that can be run on the processor. When the computer program is executed by the processor, processes of the foregoing embodiments of the measurement reporting method are implemented, and a same technical effect can be achieved. To avoid repetition, details are not described herein again.

An embodiment of this application further provides a computer-readable storage medium. The computer-readable storage medium stores a computer program, and when the computer program is executed by a processor, the processes of the foregoing embodiments of the measurement reporting method, applied to a network device, are implemented, and a same technical effect can be achieved. To avoid repetition, details are not described herein again. The computer readable storage medium is a Read-Only Memory (ROM), a Random Access Memory (RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes those elements, but also includes other elements not expressly listed, or also includes elements inherent to this process, method, article, or apparatus. An element limited by "includes a . . . ", without more constraints, does not preclude the presence of additional identical elements in the process, method, article, or apparatus that includes the element.

Based on the descriptions of the foregoing implementations, a person skilled in the art may clearly understand that the method in the foregoing embodiments may be implemented by software in addition to a necessary universal hardware platform or by hardware only. In most circumstances, the former is a preferred implementation. Based on such understanding, the technical solutions of this application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

What is claimed is:

1. A method of measurement reporting, performed by a first terminal device, comprising:
    sending configuration information for a sidelink reference signal received power (RSRP) to a second terminal device, wherein the configuration information for the sidelink RSRP comprises a threshold for RSRP reporting and a time interval for the RSRP measurement; and
    receiving a measurement result of an RSRP reported by the second terminal device when the measurement result of the RSRP reaches the threshold for RSRP reporting and remains above the threshold for RSRP reporting within the time interval for the RSRP measurement.

2. The method according to claim 1, wherein before sending configuration information for the sidelink RSRP to the second terminal device, the method further comprises:
    determining the configuration information for the sidelink RSRP according to pre-configured information or a stipulation in a protocol; or
    receiving the configuration information for the sidelink RSRP sent by a network device, wherein the network device is a network device to which the first terminal device belongs.

3. The method according to claim 2, wherein receiving the configuration information for the sidelink RSRP sent by the network device comprises:
    receiving the configuration information for the sidelink RSRP sent by the network device through radio resource control (RRC) signaling or a system information block (SIB) message.

4. The method according to claim 1, wherein sending configuration information for the sidelink RSRP to the second terminal device comprises:
    sending the configuration information for the sidelink RSRP to the second terminal device through radio resource control (RRC) signaling of a PC5 interface.

5. The method according to claim 1, wherein the configuration information for the sidelink RSRP further comprises:
    a cycle for RSRP reporting.

6. The method according to claim 5, wherein the configuration information for the sidelink RSRP further comprises preset times for which the measurement result of the RSRP reaches the threshold for RSRP reporting within the time interval for the RSRP measurement.

7. The method according to claim 1, wherein the configuration information for the sidelink RSRP further comprises a quantity of RSRP reporting.

8. The method according to claim 1, wherein the configuration information for the sidelink RSRP further comprises a reference signal used for sidelink RSRP measurement, wherein the reference signal is triggered semi-persistently or aperiodically.

9. The method according to claim 1, wherein the configuration information for the sidelink RSRP further comprises a first resource for RSRP reporting, wherein the first resource for RSRP reporting is used for the second terminal device to report the measurement result of the RSRP.

10. The method according to claim 1, further comprising:
    sending the measurement result of the RSRP to a network device, wherein the network device is a network device to which the first terminal device belongs.

11. The method according to claim 10, wherein before sending the measurement result of the RSRP to the network device, the method further comprises:
    receiving configuration information transmitted through a Uu interface and corresponding to the sidelink RSRP sent by the network device; and
    wherein sending the measurement result of the RSRP to the network device comprises:
    sending the measurement result of the RSRP to the network device according to a target resource and the configuration information transmitted through the Uu interface.

12. The method according to claim 11, wherein the target resource comprises one of the following:
    a pre-allocated resource;
    a resource dynamically sent by the network device through L1 signaling or media access control (MAC); or
    a resource obtained based on a resource request sent to the network device.

13. The method according to claim 1, further comprising:
    receiving a second resource for RSRP reporting sent by the second terminal device, wherein the second resource for RSRP reporting is used to report the measurement result of the RSRP, and the second resource for RSRP reporting is requested by the second terminal device from a network device to which the second terminal device belongs.

14. A method of measurement reporting, performed by a second terminal device, comprising:
    receiving configuration information for a sidelink reference signal received power (RSRP) sent by a first terminal device, wherein the configuration information for the sidelink RSRP comprises a threshold for RSRP reporting and a time interval for the RSRP measurement; and
    reporting a measurement result of an RSRP when the measurement result of the RSRP reaches the threshold for RSRP reporting and remains above the threshold for RSRP reporting within the time interval for the RSRP measurement.

15. The method according to claim 14, wherein receiving configuration information for the sidelink RSRP sent by the first terminal device comprises:
    receiving the configuration information for the sidelink RSRP sent by the first terminal device through radio resource control (RRC) signaling of a PC5 interface.

16. The method according to claim 14, wherein the configuration information for the sidelink RSRP is determined based on pre-configured information or a stipulation in a protocol; or the configuration information for the sidelink RSRP is sent to the first terminal device by a network device to which the first terminal device belongs.

17. The method according to claim 14, wherein the configuration information for the sidelink RSRP further comprises a cycle for RSRP reporting.

18. A method of measurement reporting, performed by a network device, comprising:

setting configuration information for a sidelink reference signal received power (RSRP), wherein the configuration information for the sidelink RSRP comprises a threshold for RSRP reporting and a time interval for the RSRP measurement; and sending the configuration information for the sidelink RSRP to a first terminal device, wherein the configuration information for the sidelink RSRP, after being sent by the first terminal device to a second terminal device, is used for the second terminal device to report a measurement result of an RSRP when the measurement result of the RSRP reaches the threshold for RSRP reporting and remains above the threshold for RSRP reporting within the time interval for the RSRP measurement.

19. The method according to claim 18, wherein sending the configuration information for the sidelink RSRP to the first terminal device comprises:

sending the configuration information for the sidelink RSRP to the first terminal device through radio resource control (RRC) signaling or a system information block (SIB) message.

20. The method according to claim 18, wherein the configuration information for the sidelink RSRP further comprises a cycle for RSRP reporting.

* * * * *